(12) United States Patent
Chen et al.

(10) Patent No.: US 11,662,004 B2
(45) Date of Patent: May 30, 2023

(54) DISCONNECTION ASSEMBLY

(71) Applicant: Shanghai XPT Technology Limited, Shanghai (CN)

(72) Inventors: Hongxia Chen, Zhejiang (CN); Chuanwei Ren, Linyi (CN)

(73) Assignee: SHANGHAI XPT TECHNOLOGY LIMITED, Shanghai (CN)

(*) Notice: Subject to any disclaimer, the term of this patent is extended or adjusted under 35 U.S.C. 154(b) by 0 days.

(21) Appl. No.: 17/359,682

(22) Filed: Jun. 28, 2021

(65) Prior Publication Data
US 2022/0389993 A1 Dec. 8, 2022

(30) Foreign Application Priority Data

Jun. 2, 2021 (CN) .......................... 202110613469.2
Jun. 2, 2021 (CN) .......................... 202121218482.X

(51) Int. Cl.
*F16H 35/00* (2006.01)
*F16C 19/54* (2006.01)
*F16D 41/00* (2006.01)

(52) U.S. Cl.
CPC ............. *F16H 35/00* (2013.01); *F16C 19/54* (2013.01); *F16D 41/00* (2013.01); *F16H 2035/005* (2013.01)

(58) Field of Classification Search
CPC .... F16D 41/00; F16H 35/00; F16H 2035/005; F16H 3/10; F16C 19/54; B60K 6/383; H02K 7/116
See application file for complete search history.

(56) References Cited

U.S. PATENT DOCUMENTS

| | | | | | |
|---|---|---|---|---|---|
| 4,229,683 A | * | 10/1980 | Watanabe | ............ | B23Q 15/013 318/626 |
| 4,315,443 A | * | 2/1982 | Kubo | ........................ | F16H 3/66 475/71 |
| 5,675,202 A | * | 10/1997 | Zenmei | ................ | H02K 7/1004 310/78 |

(Continued)

FOREIGN PATENT DOCUMENTS

| CN | 1136723 | 11/1996 |
|---|---|---|
| CN | 213298757 | 5/2021 |

(Continued)

OTHER PUBLICATIONS

Official Action with machine translation for Taiwan Patent Application No. 110128691, dated Jun. 2, 2022, 7 pages.

*Primary Examiner* — Jake Cook
(74) *Attorney, Agent, or Firm* — Sheridan Ross P.C.

(57) ABSTRACT

A disconnection assembly has a one-way clutch. The one-way clutch serves to either connect or disconnect the power connection of a vehicle. The disconnection assembly is installed in a reducer including an intermediate shaft, a bushing, an outer gear and a one-way clutch. The bushing is secured to the intermediate shaft by spline. The one-way clutch is disposed between the bushing and the outer gear. The one-way clutch is locked to drive the rotation of the intermediate shaft through the bushing when the outer gear rotates in a first direction, and the one-way clutch is released to allow the outer gear rotates freely when the outer gear rotates in a second direction.

16 Claims, 2 Drawing Sheets

(56) References Cited

U.S. PATENT DOCUMENTS

| | | | | |
|---|---|---|---|---|
| 6,024,196 | A * | 2/2000 | Miyata | F16D 41/20 |
| | | | | 192/41 R |
| 6,036,174 | A * | 3/2000 | Andersen | B66D 1/7426 |
| | | | | 74/416 |
| 6,836,037 | B1 * | 12/2004 | Tsuboi | B62M 6/45 |
| | | | | 310/67 R |
| 9,097,293 | B2 * | 8/2015 | Fenayon | F16C 19/547 |
| 2002/0100653 | A1 * | 8/2002 | Ouchi | F16D 41/00 |
| | | | | 192/11 OB |
| 2014/0080646 | A1 * | 3/2014 | Goujon | F16D 41/06 |
| | | | | 474/166 |
| 2017/0292574 | A1 * | 10/2017 | Hodge | F16D 41/067 |
| 2018/0100541 | A1 * | 4/2018 | Kato | F16C 39/02 |
| 2019/0016432 | A1 * | 1/2019 | Hashimoto | F16D 41/04 |
| 2021/0254675 | A1 * | 8/2021 | Engerman | F16H 37/082 |

FOREIGN PATENT DOCUMENTS

| | | |
|---|---|---|
| JP | 2005-321031 | 11/2005 |
| TW | M620141 | 11/2021 |

* cited by examiner

DISCONNECTION ASSEMBLY

BACKGROUND OF THE INVENTION

1. Field of the Invention

The invention relates to a disconnection assembly and, more particularly, to a disconnection assembly installed in a reducer.

2. Description of the Prior Art

When an electric four-wheel drive vehicle operates in a single-motor mode, the other motor brings issues such as reverse noise etc. A disconnection mechanism is sometimes adopted to increase cruising range, improve NVH (noise, vibration and harshness) performance, and also reduce design life of mechanical parts. Most manufacturers choose to put the disconnection function on differential parts, so that the differential parts can automatically control disconnect or connect. This solution nevertheless is problematic because it is difficult to design and costly. Additionally, limited slip differential parts may perform the disconnect function, but the risk of incomplete disconnection is high.

SUMMARY OF THE INVENTION

The invention provides a disconnection assembly installed in a reducer having a one-way clutch.

According to an embodiment of the invention, a disconnection assembly includes an intermediate shaft, a bushing, an outer gear and a one-way clutch. The bushing is secured to the intermediate shaft. The outer gear is disposed with respect to the bushing. The one-way clutch is disposed between the bushing and the outer gear. The bushing serves as an inner ring of the one-way clutch and the outer gear serves as an outer ring of the one-way clutch. When the outer gear rotates in a first direction, the one-way clutch is locked to drive the rotation of the intermediate shaft through the bushing. Additionally, when the outer gear rotates in a second direction, the one-way clutch is released to allow the outer gear rotates freely.

According to another embodiment of the invention, a reducer serves to disconnect by adopting a one-way clutch. The one-way clutch is installed on the intermediate shaft of the reducer.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
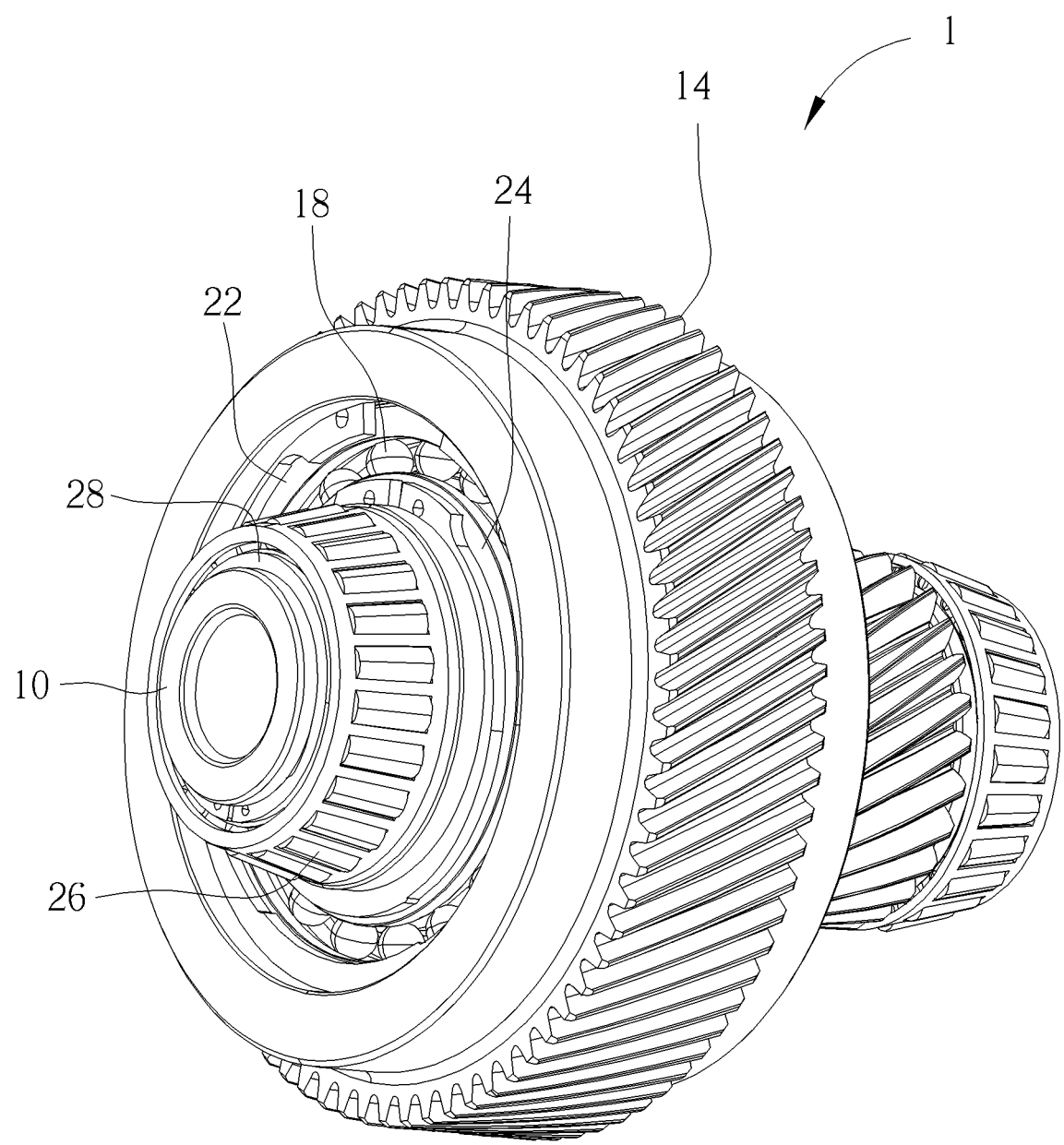
FIG. 1 is a perspective view of a disconnection assembly according to an embodiment of the invention.
Figure 2:
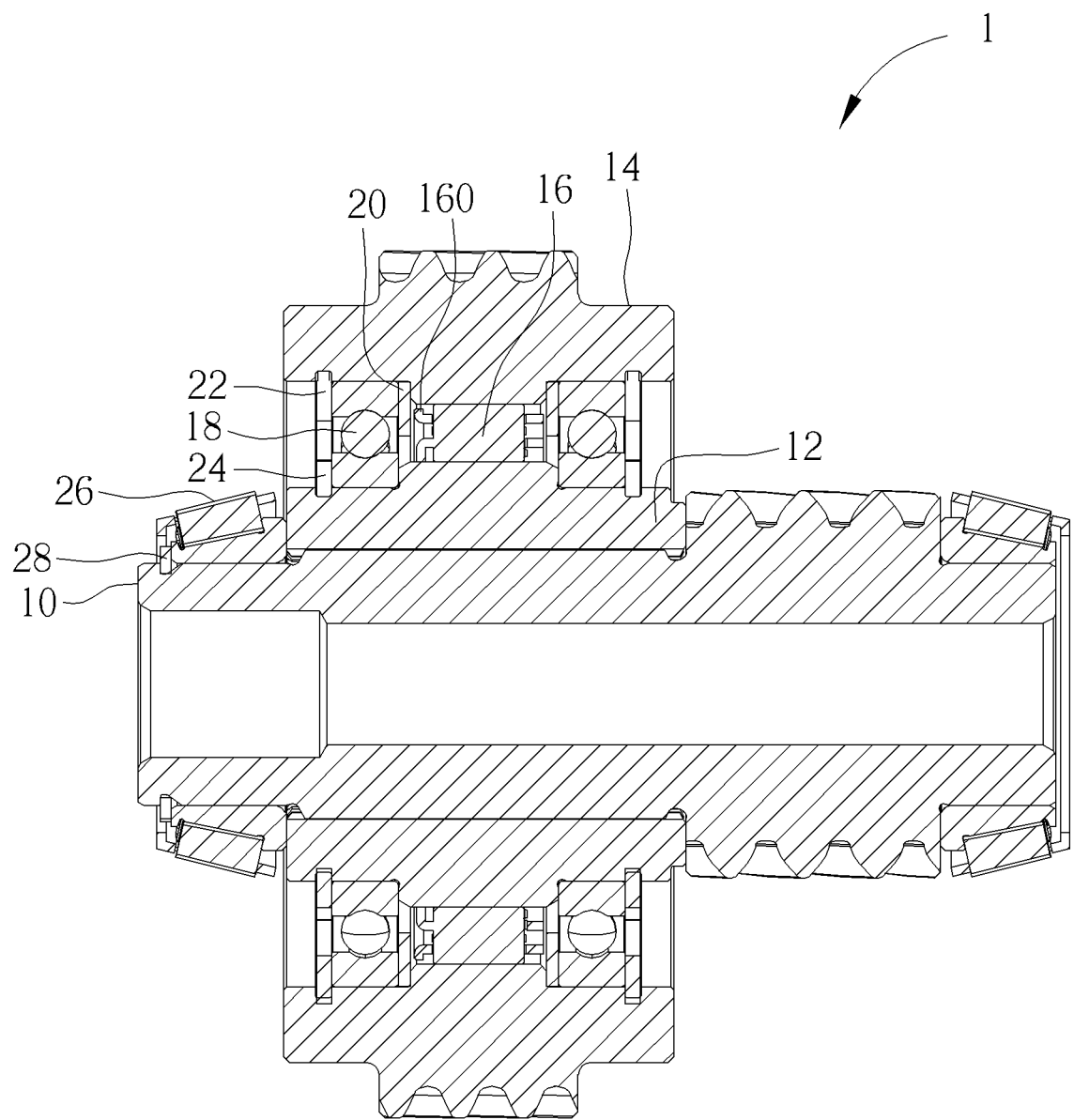
FIG. 2 is a sectional view of the disconnection assembly shown in FIG. 1.

Referring to FIGS. 1 and 2, FIG. 1 is a perspective view illustrating a disconnection assembly 1 installed in a reducer according to an embodiment of the invention and FIG. 2 is a sectional view illustrating the disconnection assembly 1 shown in FIG. 1.

As shown in FIGS. 1 and 2, a disconnection assembly 1 installed in a reducer includes an intermediate shaft 10, a bushing 12, an outer gear 14, a one-way clutch 16, two ball bearings 18, two washers 20, two hole retaining rings 22, two axial retaining rings 24, two taper bearings 26 and an axial retaining ring 28.

The bushing 12 is secured to the intermediate shaft 10. In this embodiment, the bushing 12 may be secured to the intermediate shaft 10 by spline. The outer gear 14 is disposed with respect to the bushing 12. The one-way clutch 16 is disposed between the bushing 12 and the outer gear 14. Accordingly, the outer gear 14 serves as an outer ring for the one-way clutch 16, and the bushing 12 can serve as an inner ring for the one-way clutch 16. Both of the contact surface between the bushing 12 and the one-way clutch 16 as well as the contact surface between the outer gear 14 and the one-way clutch 16 need to be of sufficient hardness, roughness and shape tolerance to ensure power connection and the bushing 12 and the outer gear 14 will not be damaged by the force upon them from the one-way clutch 16.

In one embodiment, the outer gear 14 is secured to a rotor of an electric motor through a gear of an input shaft. Additionally, the intermediate shaft 10 is secured to a gear of a differential. When the outer gear 14 rotates in a first direction, the one-way clutch 16 is locked to drive the rotation of the intermediate shaft 10 through the bushing 12. When the outer gear 14 rotates in a second direction, the one-way clutch 16 is released to allow the outer gear 14 rotates freely. The first direction and the second direction are opposite. For example, the first direction is clockwise and the second direction is counterclockwise; vice versa.

The two ball bearings 18 are disposed at two sides of the one-way clutch 16 to ensure the accuracy of the position of the outer gear 14 and bear the axial force and torque transmitted from the outer gear 14. Each of the two washers 20 is disposed between the ball bearing 18 and the one-way clutch 16. Each washer 20 is used to retain an outside holder 160 of the one-way clutch 16, so as to prevent the one-way clutch 16 from sliding. The inner diameter of the washer 20 needs to be as large as possible to ensure that the lubricant oil on both sides flows into the one-way clutch 16. Each of the two hole retaining rings 22 is disposed at an outer periphery of the ball bearing 18. Each of the two axial retaining rings 24 is disposed at an inner periphery of the ball bearing 18. The arrangement prevents the ball bearing 18 from sliding. The two taper bearings 26 are disposed at two sides of the intermediate shaft 10. The taper bearings 26 serve to bear the axial force upon them when the outer gear 14 rotates. The axial retaining ring 28 is disposed at one side of either taper bearing 26. As shown in FIG. 2, the axial retaining ring 28 is disposed at one side of the taper bearing 26 at the left-hand side to prevent the taper bearing 26 from sliding.

Based on the foregoing, the invention discloses a disconnection assembly through the adoption of a one-way clutch installed on the intermediate shaft of the reducer. By the design, the one-way clutch is locked when a vehicle moves forward, and is released when the vehicle moves backward. The invention not only resolves issues such as reverse noise and efficiency loss etc., but also is achieved without an actuator.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A reducer equipped with a disconnection assembly, comprising:
   an intermediate shaft;
   a bushing secured to the intermediate shaft;
   an outer gear disposed with respect to the bushing; and
   a one-way clutch disposed between the bushing and the outer gear;
   wherein the one-way clutch is locked to drive the rotation of the intermediate shaft through the bushing when the outer gear rotates in a first direction, and the one-way clutch is released to allow the outer gear to rotate freely when the outer gear rotates in a second direction;
   wherein the first direction and the second direction are opposite,
   wherein the outer gear is used to be secured to a rotor of an electric motor through a gear of an input shaft,
   wherein the intermediate shaft is used to be secured to a gear of a differential.

2. The reducer of claim 1, further comprising two ball bearings respectively disposed at two sides of the one-way clutch.

3. The reducer of claim 2, further comprising two washers, each of them being disposed between one of the ball bearings and the one-way clutch.

4. The reducer of claim 2, further comprising two hole retaining rings, each of them being disposed at an outer periphery of one of the ball bearings.

5. The reducer of claim 2, further comprising two axial retaining rings, each of them being disposed at an inner periphery of one of the ball bearings.

6. The reducer of claim 1, wherein the bushing is secured to the intermediate shaft by spline.

7. The reducer of claim 1, further comprising two taper bearings respectively disposed at two sides of the intermediate shaft.

8. The reducer of claim 7, further comprising an axial retaining ring disposed at one side of either one of the taper bearings.

9. A disconnection assembly, comprising:
   an intermediate shaft;
   a bushing secured to the intermediate shaft;
   an outer gear disposed with respect to the bushing; and
   a one-way clutch disposed between the bushing and the outer gear;
   wherein the one-way clutch is locked to drive the rotation of the intermediate shaft through the bushing when the outer gear rotates in a first direction, and the one-way clutch is released to allow the outer gear to rotate freely when the outer gear rotates in a second direction;
   wherein the first direction and the second direction are opposite,
   wherein the outer gear is used to be secured to a rotor of an electric motor through a gear of an input shaft,
   wherein the intermediate shaft is used to be secured to a gear of a differential.

10. The disconnection assembly of claim 9, further comprising two ball bearings respectively disposed at two sides of the one-way clutch.

11. The disconnection assembly of claim 10, further comprising two washers, each of them being disposed between one of the ball bearings and the one-way clutch.

12. The disconnection assembly of claim 10, further comprising two hole retaining rings, each of them being disposed at an outer periphery of one of the ball bearings.

13. The disconnection assembly of claim 10, further comprising two axial retaining rings, each of them being disposed at an inner periphery of one of the ball bearings.

14. The disconnection assembly of claim 9, wherein the bushing is secured to the intermediate shaft by spline.

15. The disconnection assembly of claim 9, further comprising two taper bearings respectively disposed at two sides of the intermediate shaft.

16. The disconnection assembly of claim 15, further comprising an axial retaining ring disposed at one side of either one of the taper bearings.

* * * * *